US010146945B2

United States Patent
Ylinen et al.

(10) Patent No.: US 10,146,945 B2
(45) Date of Patent: Dec. 4, 2018

(54) APPARATUS AND A METHOD FOR PROCESSING DATA

(71) Applicant: ABB Schweiz AG, Baden (CH)

(72) Inventors: Johannes Ylinen, Helsinki (FI); Mika Luotojarvi, Helsinki (FI); Riku Hyttinen, Helsinki (FI); Simo Säynevirta, Helsinki (FI)

(73) Assignee: ABB Schweiz Ag, Baden (CH)

( * ) Notice: Subject to any disclaimer, the term of this patent is extended or adjusted under 35 U.S.C. 154(b) by 0 days.

(21) Appl. No.: 15/323,703

(22) PCT Filed: Jul. 3, 2014

(86) PCT No.: PCT/IB2014/062812
§ 371 (c)(1),
(2) Date: Jan. 3, 2017

(87) PCT Pub. No.: WO2016/001718
PCT Pub. Date: Jan. 7, 2016

(65) Prior Publication Data
US 2017/0185786 A1    Jun. 29, 2017

(51) Int. Cl.
*G06F 21/60* (2013.01)
*H04L 29/06* (2006.01)

(52) U.S. Cl.
CPC ............ *G06F 21/602* (2013.01); *H04L 63/06* (2013.01); *H04L 63/0861* (2013.01); *H04L 63/105* (2013.01)

(58) Field of Classification Search
CPC ... G06F 21/602; H04L 63/0861; H04L 63/06; H04L 63/105
See application file for complete search history.

(56) References Cited

U.S. PATENT DOCUMENTS

| 8,260,900 | B2* | 9/2012 | Morrison | H04L 29/00 709/223 |
| 8,375,068 | B1* | 2/2013 | Platt | G06Q 10/10 705/7.29 |

(Continued)

FOREIGN PATENT DOCUMENTS

KR    1020120105626 A    9/2012

OTHER PUBLICATIONS

International Search Report and Written Opinion, PCT/IB2014/062812, ABB Technology AG, dated Mar. 11, 2015, 8 pages.

(Continued)

*Primary Examiner* — Michael Pyzocha
(74) *Attorney, Agent, or Firm* — J. Bruce Schelkopf; Taft Stettinius & Hollister LLP

(57) ABSTRACT

The invention relates to a central data collection apparatus. The central data collection apparatus comprises an interface for receiving data relating to devices arranged at a plurality of different installation sites. A data storage stores the data received via the interface. A data distributor is configured to receive a request for data regarding a specific device identified in the request from a user equipment, to access the user credential storage for determining the access rights of the, to determine what, parts of the data regarding the identified device the user is authorized to receive and to allow the user equipment to access the part of the data the user is authorized to access.

18 Claims, 3 Drawing Sheets

(56) References Cited

U.S. PATENT DOCUMENTS

| | | | | |
|---|---|---|---|---|
| 8,625,602 B2* | 1/2014 | Jansson | ............... | H04L 27/2601 370/351 |
| 9,626,700 B1* | 4/2017 | Thimsen | ................ | G06Q 30/06 |
| 2004/0047298 A1* | 3/2004 | Yook | ................ | H04L 29/12254 370/254 |
| 2006/0133828 A1* | 6/2006 | Rommelmann | ..... | G03G 15/553 399/8 |
| 2008/0218316 A1* | 9/2008 | Marques | ................ | G06Q 10/00 340/10.52 |
| 2009/0298480 A1* | 12/2009 | Khambete | ......... | G06F 17/30699 455/414.1 |
| 2010/0228854 A1* | 9/2010 | Morrison | ................ | H04L 29/00 709/224 |
| 2011/0138307 A1* | 6/2011 | Eizadi | ............... | G06F 17/30867 715/760 |
| 2013/0080522 A1* | 3/2013 | Ren | ..................... | H04L 12/6418 709/204 |
| 2013/0211559 A1 | 8/2013 | Lawson et al. | | |
| 2013/0303110 A1* | 11/2013 | Gauthier | ................. | H04L 63/30 455/405 |
| 2014/0068048 A1* | 3/2014 | Kind | ................... | H04L 41/0879 709/223 |
| 2014/0110468 A1* | 4/2014 | Kandregula | ....... | G06Q 30/0241 235/375 |
| 2014/0325551 A1* | 10/2014 | McMillan | ........ | H04N 21/25841 725/20 |

OTHER PUBLICATIONS

International Preliminary Report on Patentability, PCT/IB2014/062812, ABB Technology AG, dated Jun. 14, 2016, 10 pages.

* cited by examiner

US 10,146,945 B2

APPARATUS AND A METHOD FOR PROCESSING DATA

BACKGROUND OF THE INVENTION

Field of the Invention

This invention relates to a central data collection apparatus and to a method for processing data. More particularly, the invention relates to a solution for improving distribution of data relating to devices to authorized users.

Description of Prior Art

Previously there is known a solution where electric apparatuses are controlled and monitored by control devices arranged at the same installation site as the electric apparatuses in question. Data relating to an electric apparatus is collected and stored by the respective control device in a data storage at the installation site. In this way it can be ensured that personnel working at the installation site and for whom access rights to the data have been defined, have access to the data relating to the electric apparatus at the installation site where they need it.

A problem with the above described solution is that other interested persons do not have access to the data stored at the installation site, unless access rights are defined for them at the installation site in question. Such other interested persons may include service personnel or end consumers, for instance. These persons are very seldom given the required access rights for accessing the data stored at the installation site, due to security concerns.

Therefore service personnel employed by the manufacturer of the devices in a factory, for instance, may have difficulties in obtaining the data needed in order to efficiently service the devices in question.

SUMMARY OF THE INVENTION

An object of the present invention is to solve the above mentioned drawback and to provide a solution improving the distribution of data relating to devices to authorized users in a secure manner. This and other objects of the invention are achieved with the apparatus and method of independent claims 1 and 9.

The use of a central data collection apparatus arranged to maintain data received from control devices monitoring devices at a plurality of different sites, makes it possible to allow interested persons to access data relating to the devices without a need for allowing all interested persons with access to the data at the installation sites of the control devices. Instead the data or selected parts of the data may be forwarded to a central data storage apparatus, via which the interested persons may be allowed access to the data collected from several different installation sites. When requesting data for a specific device, user credentials ensure that the interested persons are directly allowed access to the correct part of the data, and only to the part of the data which they are authorized to access.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
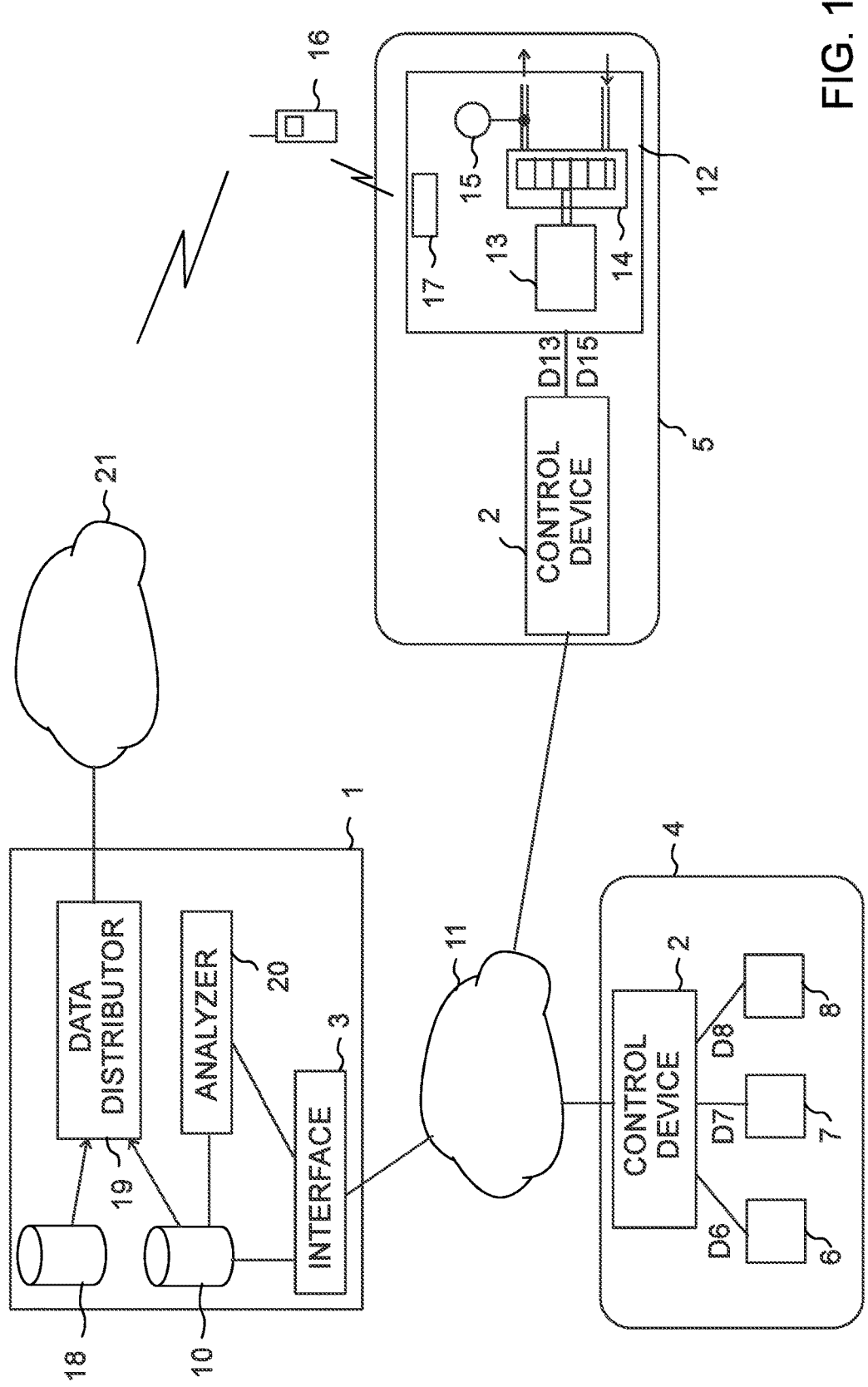
FIG. 1 illustrates a first embodiment of a central data collection apparatus and of a method for processing data.

FIG. 1 illustrates a first preferred embodiment of a central data collection apparatus 1 and of a method for processing data. The central data collecting apparatus 1 is connected via an interface 3 to a plurality of control devices 2 which are arranged at geographically different installation sites 4 and 5. The control devices may be implemented as separate standalone devices including their own hardware or alternatively of logical devices such as hardware, software or combinations of hardware and software which are embedded in one or more of the devices (such as in a motor drive, for instance) that are being controlled at the site.

Site 4 may be a factory, for instance, utilizing three different devices 6, 7 and 8. The devices 6, 7, and 8 are controlled and monitored by the control device 2 which obtains data D6, D7 and D8 relating to these devices. The data D6, D7 and D8 is stored locally at the installation site 4 and selected parts of the data or the entire data D6, D7 and D8 is sent from the control device 2 at the installation site 4 to the central data collection apparatus 1, where it is stored in the data storage 10. The data transmission between the control device 2 at the installation site 4 and the central data collection apparatus 1 may be implemented via the Internet 11, for instance.

Similarly the control device 2 monitors and possibly controls the operation of the device 12 at site 5, which may be a power plant, for instance. In the following it will by way of example be assumed that the device 12 includes an electric motor 13 driving a pump 14 which pumps a liquid. A sensor 15 is used to measure the flow of the pumped liquid. Due to the monitoring, the control device 2 at the installation site 5, which is located geographically at a different location than the installations site 4, obtains data D13 describing the status of the electric motor, such as information about the speed, torque and temperature, for instance, and also data D15 which relates to the pump 14, such as information about the flow as measured by the sensor 15. The control device 2 stores the data D13 and D15 locally at installation site 5, and additionally sends it to the central data collection apparatus 1.

Persons working at the factory 4 or power plant 5 are allowed access to the data D6, D7, D8, D13 and D15 locally at the installation sites 4 and 5 via the automation systems of these sites, the control devices 2 being a part of these automation systems. The employees of the companies which have manufactured the electric motor 13 or the pump 14, and which are visiting the installation site 5 in order to handle maintenance of these devices are usually not allowed to access data in the automation system due to security reasons. Instead in the embodiment of FIG. 1 such service personnel may access the data they need via the central data collection apparatus 1.

In the illustrated example, the person needing access to the data regarding the device 12 may use a user equipment 16, such as a mobile phone, to obtain the needed data. The user sends with the user equipment 16 a request for data identifying the specific device 12 for which data is needed. In order to identify the device, the device may have a unique identifier 17 available for the user equipment 16. The device may additionally have a secret key stored at the time of manufacturing into a circuitry of the device 12. This key and the unique identifier 17 may be used to generate a secure session identifier which is sent to the central data collection apparatus 1 in a request. The central data collection apparatus may have a private key of the manufacturer such that the central data collection apparatus may decrypt the secure session identifier to determine that the user equipment has sent the unique identifier 17 of the correct device 12. The unique identifier 17 may be a code, such as a bar code or a QR code, which is presented as graphical pattern that can be read with a reading device (such as camera) integrated into the user equipment 16. Alternatively the unique identifier 17 may be stored in a NFC (Near Field Communication) tag from where the unique identifier 17 may be read with radio signals, for instance. Preferably the code or tag also includes address information, which makes it possible for the user device 16 to transmit the request via a communication system, such as a cellular radio network 21 to the correct address of the central data collection apparatus 1. Naturally the central data collection apparatus may be connected to the cellular radio network 21 via the Internet 11 and not directly, as illustrated for simplicity. One alternative is that the code or tag contains the IP address of a WEB page maintained by the central data collection apparatus 1 for the device 12 in question, such that reading of the code or tag automatically triggers the user equipment to open the WEB browser and to display WEB page maintained by the central data collection apparatus 1 for the device 12. As an alternative to opening the WEB browser an application installed on the user equipment may be launched to provide the user with the information.

The central data collection apparatus 1 comprises a user credential storage 18, containing information about authorized users and their access rights to data and the related equipment, and a data distributor 19 which handles processing of requests received from user equipments. In this example it is assumed that the user is identified based on the identity of the user equipment 16. However, the user identification may also require that the user equipment 16 provides the central data collection apparatus 1 with information in the request that indicates that the user of the user equipment 16 has been biometrically identified, for instance. Such a biometric identification may be based on fingerprint identification, for instance.

Once the user has been identified, the data distributor 19 determines the access rights of the user by utilizing information maintained in the user credential storage 18. Based on the access rights a determination is carried out to identify the parts of the data and the level of access rights (no access, read, write, update etc.) regarding the identified device 12 that the user is authorized to receive, and the user is provided with access to this part of the data.

In the illustrated example the central data collection apparatus 1 includes an analyzer 20 configured to analyze the data D6, D7, D8, D13 and D15 received for the different devices 6-8 and 12, and to produce one or more diagrams of the analyzed data for distribution by the data distributor 19. This analyzing and diagram producing may be carried out continuously in real time as new data is received regarding the devices. Alternatively, it may be carried out once the data distributor has identified what parts of the data the user is authorized to receive, such that one or more diagrams may be produced from this data and sent to the user equipment 16 from which the request has been received. Consequently, the user of the user equipment 16 is provided with the part of the data that the user is authorized to receive such that the data can be presented for the user on the display of the user equipment in a numerical format, as a diagram or as a combination of these. A diagram may present data as a history trend, in other words as diagram illustrating how specific measurement values have changed over a certain time period, for instance.

The central data collection apparatus 1 preferably contains information about user groups and to which user group a specific user belongs. This information is useful in order to determine if the user should have access to the entire data relating to a device or if a part of the data should be kept secret for this specific user. In addition, the information is also useful to improve the user friendliness by ensuring that the user is directly provided with the correct part of the data relating to a specific device.

In the illustrated example the data storage 10 contains (at least) two different sets of data for the device 12, in other words data D13 relating to the electric motor 13 and data D15 relating to the pump 14. Different persons may be interested in data regarding the electric motor and the pump. In order to take this into account and to make it as easy and user friendly as possible for a person needing data about the device 12 to obtain the correct data, service personnel of the company having manufactured the electric motor 13 may be classified into a first user group, such that they are directly provided with access to data D13 relating to the electric motor 13 once a request for data regarding device 12 is received from these authorized users, while service personnel of the company having manufactured the pump 14 may be classified into a second user group, such that they are directly provided with access to data D15 relating to the pump 14 once a request for data regarding device 12 is received from these users. The users of the above mentioned first group (electric motor service personnel) are not necessarily denied access to data D15 regarding the pump 14, however, they are preferably at least initially provided with data D13 regarding the electric motor 13, but with an option of manually selecting the data D15 via a user interface of the user equipment 16, if they want to do so and given they have the appropriate access rights to the said data. The classification of the users may be implemented in the user credentials, for instance, such that the user credential storage 18 contains information about the user group for at least some of the users.

As is clear from the above explanation, the central data collection apparatus may contain a replica of the data available at the different installation sites from where it receives data. It is also possible that the entire data of a single installation site is for security reasons not sent to the central data collection apparatus, but instead filtering of the data is implemented in order to send only selected parts of the data from the site to the central data collection apparatus. The blocks of the central data collection apparatus illustrated in FIG. 1 may be implemented as one or more electronic circuits or a as a combination of circuits and computer programs. One alternative is to implement the central data collection apparatus as a server or computer which is connected to the Internet.

Figure 2:
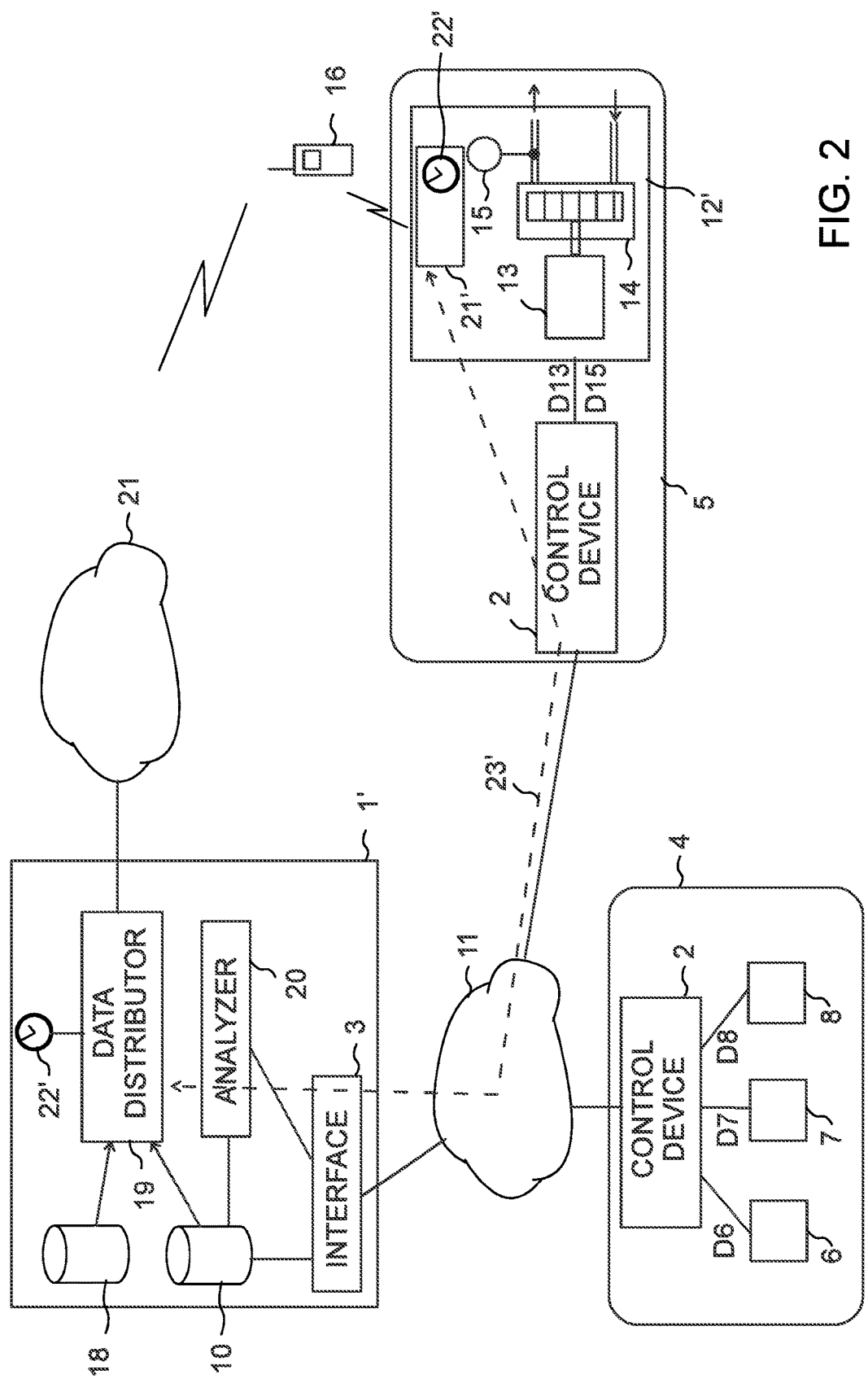
FIG. 2 illustrates a second embodiment of a central data collection apparatus and of a method for processing data.

FIG. 2 illustrates a second embodiment of a central data collection apparatus and of a method for processing data. The embodiment of FIG. 2 is very similar to the one explained in connection with FIG. 1. Therefore the embodiment of FIG. 2 is in the following explained mainly by pointing out the differences between these embodiments.

In the embodiment of FIG. 2, the central data collection apparatus 1' maintains for each device 12' whose data is stored in the data storage a unique identifier which is also available for a user equipment 16 at the installation site 5 of the device 12'. Once a request is received from a user equipment 16, the device to which the request is related is identified with the identifier included in the request. If the request includes an identifier which is not maintained at the central data collection apparatus 1', or the user does not have access rights to see the related data, the user of the user equipment 16 is not provided with any data, as the correct device has not been identified or the user of the user equipment 16 does not have the appropriate access rights to said data.

In the embodiment of FIG. 2 the central data collection apparatus 1' is configured to change the unique identifier for at least one of the devices according to a predefined process. The unique identifier may be changed periodically with regular time intervals, for instance. In this way it can be ensured that only a person who is actually present at the installation site 5 of a device 12' at that particular moment has access to data regarding this device 12'. Later on, when the person is no longer at the site 5 of the device 12', the unique identifier of the device 12' has changed and this person cannot any more use an old identifier possibly obtained earlier with a user equipment 16 from the site 5 of the device 12'.

There exists several possible alternatives for implementing a predefined process for changing the unique identifier. A first alternative is that the device 12' at the site 5 is provided with an apparatus 21', such as an electronic circuit from where the identifier can be read with the user equipment 16, and this apparatus is provided with a timer or clock 22' used by the apparatus 21' to calculate a new time dependent identifier at predetermined intervals. In that case a timer or clock 22' with a similar time indication is provided also at the central data collection apparatus 1', such that the central data collection apparatus 1' can carry out the same calculation with the same predetermined intervals and arrive to a corresponding new identifier. A second alternative in order to avoid the need of the mutually synchronized clocks, is that the central data collection apparatus 1' is configured to communicate with the apparatus 21' at the installation site 5 of the device 12'. The communication path 23' may be implemented via the control device 2 and the interface 3 of the central data collection apparatus 1' along the same route as data is transmitted from the installation site 5 to the central data collection apparatus 1'. In that case either the apparatus 21' or the central data collection apparatus 1' may trigger the change of the unique identifier for the device 12' and transmit the new identifier via the communication path 23' to the other one of them.

One alternative to implement the above mentioned second alternative is as follows. The person needing access to the data regarding the device 12' may use a user equipment 16, such as a mobile phone, to obtain the needed data. The user gets an URL containing the server address, in other words the address of the central data collection apparatus 1', and a unique identifier of the specific device 12' for which data is needed. This URL can be provided to user equipment 16 by a dynamic or static QR code, NFC or printed text, for instance. The user then sends a request for data by connecting to the central data collection apparatus 1' (specified in the URL) using a secure connection (such as HTTPS), authenticates and provides the device id. The central data collection apparatus 1' then creates an encrypted unique session verification identifier, which is valid only for a certain period of time, like 1-3 minutes and passes it to the device 12'. The user must then read the session verification identifier from the device 12' device using the user equipment 16 via some way, such as a dynamic QR code, or NFC. This identifier is then passed back to the central data collection apparatus 1' via the previously established secure communication link. An embodiment like this can be used to ensure that the user requesting the data and the used user equipment 16 are at the close proximity of the device 12' when data is requested. Thereby the security is enhanced, as access to the data is limited to the authorized persons who have also physical access to the premises where the equipment 12' is located.

Figure 3:
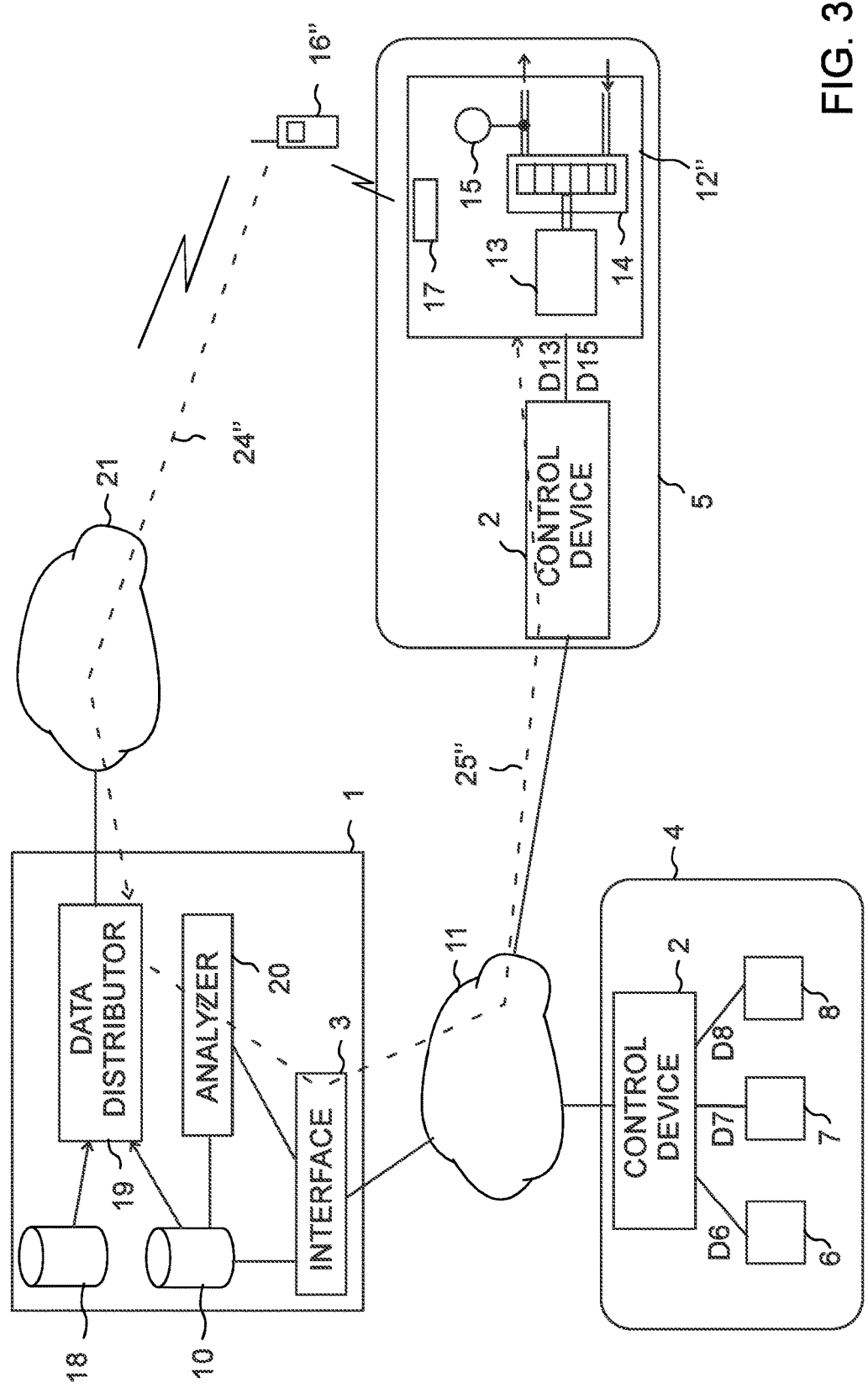
FIG. 3 illustrates a third embodiment of a central data collection apparatus and of a method for processing data.

FIG. 3 illustrates a third embodiment of a central data collection apparatus and of a method for processing data. The embodiment of FIG. 3 is very similar to the one explained in connection with FIG. 1. Therefore the embodiment of FIG. 1 is in the following explained mainly by pointing out the differences between these embodiments.

In FIG. 3 the central data collection apparatus 1" is configured to receive also requests with control commands from user equipment 16". These requests may be received via the same path 24" as requests for data are received, as explained in connection with FIG. 1.

Once a request with a control command is received, the request is processed as explained earlier to determine the access rights of the user and in order to identify the device 12" to which the control request relates. If the central data collection apparatus 1" determines that the user has the right to the control command in question, this control command is sent via the interface 3 to the device 12" via path 25", for instance. In this way the user of the user equipment 16" may both receive data regarding the device 12" at site 5 and additionally give control commands to this device 12" via the central data collection apparatus 1" in order to change settings in this device 12", for instance. One alternative is also to issue control commands that control the device to a firmware update.

Additional security measures may be required to facilitate that users may send control commands via the central data collection apparatus 1" to devices. One requirement may be that a predefined process for changing the unique identifier of the device is in use, in a way which has been explained in connection with FIG. 2, for instance. In this way it can be ensured that only a user having actually access to the installation site at that particular moment, such that the user can obtain the latest unique identifier with the user equipment, is given the opportunity to send control commands to the device at the installation site in question. Additionally there may be a requirement that the user has been biometrically identified by the user equipment in order to be able to send such control commands via the central data collection apparatus. In this way it can be avoided that a user with a stolen user equipment can send such commands.

Above a few embodiments have been explained with reference to the figures, though it is clear for a person skilled in the art that also other implementations are possible. Such alternative implementations may include:

1) Energy efficiency monitoring in a (process) industry plant, where the data collection process is embedded with the process equipment and systems. The data is provided from the installation sites by streaming relevant data to the central data collection apparatus, which provides a cloud based historian. Access may be provided to the selected data based on the authority of the role of the user. The data can be used for determining specific energy consumption of the asset, such as equipment, process, plant section or entire plant with the data.

2) Asset management and remote service or asset health in industrial plant context. The focus may be on asset performance and remote troubleshooting. Specific case examples are for instance with rotating machinery (where motor drives are used as a data source for the condition of the rotating machinery); the control system PID loop data may be used to determine the condition of the process, its control, and the instrumentation on the process.

3) Smart Grid for the data collection and disturbance records from Intelligent Electronic Devices (protection relays, phasor measurement units, etc.). Consolidate selected data is provided to the cloud service, in other words the central data collection apparatus. Fleet level analytics may be preformed of the performance of the grid. The stored data in the central data collection apparatus may be used to steer the maintenance activities & power restoration activities. Preventive maintenance and regulatory audits may be carried out based on actual usage data without having to visit the installation site physically.

4) Building automation where data is collected from building sensors and actuators. The collected data may be used to perform energy efficiency analysis. This may result in opportunities to include optimization of the demand response in the smart grid and the integration of the renewable generation and energy storages on the facility level.

It is to be understood that the above description and the accompanying figures are only intended to illustrate the present invention. It will be obvious to a person skilled in the art that the invention can be varied and modified without departing from the scope of the invention.

The invention claimed is:

1. A central data collection apparatus, the central data collection apparatus comprises:
   an interface for receiving data relating to devices and which data is provided by control devices arranged at a plurality of different installation sites for monitoring the operation of the respective devices at the respective installation sites,
   a data storage for storing the data received via the interface,
   a user credential storage for storing credentials of authorized users allowed to access data relating to the devices, and
   a data distributor configured to receive a request for data regarding a specific device identified in the request from a user equipment, to access the user credential storage for determining the access rights of the user in question, to determine what parts of the data regarding the identified device the user is authorized to receive, and to allow the user equipment to access the part of the data the user is authorized to access, wherein
   at least one of the interface, the data storage, the user credential storage or the data distributor is implemented as one or more electronic circuits or as a combination of circuits and computer programs,
   the central data collection apparatus maintains for each device whose data is stored in the data storage a unique identifier which is also available for a user equipment at the installation site of the device in question, and
   the central data collection apparatus is configured to retrieve from the request received by the data distributor a unique identifier and if this identifier corresponds to one of the unique identifiers maintained at the central data collection apparatus for one of the devices, identify this device as the device to which the request relates, the unique identifier being available at the installation site of the specific device in a tag including the unique identifier and address information of the central data collection apparatus.

2. The central data collection apparatus according to claim 1, wherein the central data collection apparatus is configured to change the unique identifier maintained for at least one of the devices according to a predefined process.

3. The central data collection apparatus according to claim 2, wherein the central data collection apparatus comprises an analyzer configured to analyze the data received for a respective device and to produce one or more diagrams of the analyzed data for distribution by the data distributor in response to requests for data regarding the respective device.

4. The central data collection apparatus according to claim 2, wherein; the central data collection apparatus is configured to receive a request with a control command for a specific device identified in the request, to access the user credential storage for determining the access rights of the user in question, to determine if the user is authorized to send the control command to the identified device, and to send the control command to the device if the user is authorized to send the control command in question to the identified device.

5. The central data collection apparatus according to claim 2, wherein the central data collection apparatus is configured to determine that the user does not have any access rights unless the received request indicates that the user of the user equipment has been biometrically identified.

6. The central data collection apparatus according to claim 1, wherein the central data collection apparatus is configured to communicate with an apparatus at the installation site of the at least one device in order to change the unique identifier maintained by the central data collection apparatus and maintained at the installation site for the at least one device.

7. The central data collection apparatus according to claim 6, wherein the central data collection apparatus comprises an analyzer configured to analyze the data received for a respective device and to produce one or more diagrams of the analyzed data for distribution by the data distributor in response to requests for data regarding the respective device.

8. The central data collection apparatus according to claim 6, wherein the central data collection apparatus is configured to receive a request with a control command for a specific device identified in the request, to access the user credential storage for determining the access rights of the user in question, to determine if the user is authorized to send the control command to the identified device, and to send the control command to the device if the user is authorized to send the control command in question to the identified device.

9. The central data collection apparatus according to claim 6, wherein the central data collection apparatus is configured to determine that the user does not have any access rights unless the received request indicates that the user of the user equipment has been biometrically identified.

10. The central data collection apparatus according to claim 1, wherein the central data collection apparatus comprises an analyzer configured to analyze the data received for a respective device and to produce one or more diagrams of the analyzed data for distribution by the data distributor in response to requests for data regarding the respective device.

11. The central data collection apparatus according to claim 10, wherein the central data collection apparatus is configured to receive a request with a control command for a specific device identified in the request, to access the user credential storage for determining the access rights of the user in question, to determine if the user is authorized to send the control command to the identified device, and to send the control command to the device if the user is authorized to send the control command in question to the identified device.

12. The central data collection apparatus according to claim 1, wherein the central data collection apparatus is configured to receive a request with a control command for a specific device identified in the request, to access the user credential storage for determining the access rights of the user in question, to determine if the user is authorized to send the control command to the identified device, and to send the control command to the device if the user is authorized to send the control command in question to the identified device.

13. The central data collection apparatus according to claim 1, wherein the central data collection apparatus is configured to determine that the user does not have any access rights unless the received request indicates that the user of the user equipment has been biometrically identified.

14. The central data collection apparatus according to claim 1, wherein the central data collection apparatus is configured to determine that the user does not have any access rights unless the received request includes secure session identifier which the central data collection apparatus can decrypt with a key to obtain the unique identifier of the device.

15. A method for providing data to a user equipment, comprising:
providing a central data collection apparatus implemented with one or more electronic circuits or as a combination of circuits and computer programs with data relating to devices from control devices arranged at a plurality of different installation sites for monitoring the operation of the respective devices,
maintaining a unique identifier for a specific device available for a user equipment at the central data collection apparatus and at the installation site of the device, and
providing the user equipment with data regarding the specific device from the central data collection apparatus when a request identifying the device with the unique identifier is received from the user equipment, such that the user equipment is provided with a part of the data which the user equipment according to user credentials is authorized to access, the unique identifier maintained at the central data collection apparatus being available at the installation site of the specific device in a tag including the unique identifier and address information of the central data collection apparatus.

16. The method according to claim 15, wherein the unique identifier of the device is changed over time according to a predefined process.

17. The method according, to claim 16, wherein the unique identifier of the specific device is maintained at the installation site in a format that can be read by the user equipment.

18. The method according to claim 15, wherein the unique identifier of the specific device is maintained at the installation site in, a format that can he read by the user equipment.

* * * * *